May 3, 1960 J. L. FOY 2,935,744

IDENTIFICATION SYSTEM

Filed June 4, 1956 7 Sheets-Sheet 1

INVENTOR.
JAMES L. FOY
BY
[signature]
ATTORNEY.

IDENTIFICATION SYSTEM

Filed June 4, 1956 7 Sheets-Sheet 2

INVENTOR.
JAMES L. FOY
BY
[signature]
ATTORNEY.

INVENTOR.
JAMES L. FOY
BY
[signature]
ATTORNEY.

INVENTOR.
JAMES L. FOY
BY
ATTORNEY.

IDENTIFICATION SYSTEM

Filed June 4, 1956 7 Sheets-Sheet 5

INVENTOR.
JAMES L. FOY
BY [signature]
ATTORNEY.

May 3, 1960 J. L. FOY 2,935,744

IDENTIFICATION SYSTEM

Filed June 4, 1956 7 Sheets-Sheet 6

INVENTOR.
JAMES L. FOY
BY
ATTORNEY.

INVENTOR.
JAMES L. FOY
BY
[signature]
ATTORNEY.

United States Patent Office 2,935,744

Patented May 3, 1960

2,935,744

IDENTIFICATION SYSTEM

James L. Foy, Culver City, Calif., assignor to Gilfillan Bros., Inc., Los Angeles, Calif., a corporation of California Application June 4, 1956, Serial No. 589,175

11 Claims. (Cl. 343—11)

The subject matter of this invention in its broad aspect relates to a multi-channel radar tracking system and more specifically to an auxiliary to existing ground controlled approach (GCA) systems to show visually the position of each of a number of aircraft coming in to land, and to exhibit the elevation picture in juxtaposition to each indication of position a symbol that identifies the tracking channel assigned to each craft. The position of the craft, both as to range from touch down and with respect to a glide path, together with the identifying symbol is shown on an azimuth-elevation (az-el) indicator. Particularly, the present invention concerns the method and means for generating the identifying symbol, and hence the equipment may be termed a symbol, or letter, generator. Inasmuch as this invention adds to, or supplements, the function of a GCA system, it may be termed a functional supplement to the GCA.

The data relative to approaching planes are obtained by a track-while-scan (TWS) radar which feeds a sequencing device that seriatim supplies to each tracking unit, the data applicable to the craft in that channel and at the beginning of each scan it initiates a system pulse that causes the operation, in synchronism, of the several components of the device to be described hereafter. Each tracking channel unit puts out a range pulse that defines the relative time-position of the craft in that channel and also an error warning signal if that craft gets into such a position as to constitute a hazard or be in jeopardy.

The TWS radar, the sequencing device, and the tracking channel units are all well known and are of concern here only so far as they are sources of impulses required to effect the results contemplated by this invention.

Each symbol that is generated appears in the elevation picture of the az-el indicator directly below the mark indicating the position of the aircraft in the channel which each symbol designates, and moves in synchronism with the mark as the plane comes in to touch down. Conveniently, letters of the alphabet may be the symbols employed. A logarithmic display on the az-el is preferred since it expands the scale at shorter ranges where greater accuracy is vital. Distortion of the symbols at short ranges is avoided by employing an exponentially varying voltage to generate the symbol, the voltage increasing the slope of the letter generator horizontal sweep voltage at short ranges.

Normally a fan-shaped sector on the az-el indicator is scanned radially from the vertex of the sector. Symbols or letters are preferably produced only in a portion of the sector. The letter generator includes a plurality of individual cathode-ray type electron tubes to produce a number of symbols or letters corresponding to the identities of aircraft, which number is representative of the capacity of the associated GCA system. It would normally be necessary to scan both the electron-tubes and the indicator synchronously. Although it is an object of the invention to provide an image of a symbol adjacent a range indication to identify the range indication with a corresponding tracking channel, absolute juxtaposition is obviated by the present invention wherein a novel switching arrangement is employed to provide a different horizontal sweep voltage for each of the cathode-ray type electron tubes.

In accordance with this feature of the invention although one horizontal sweep generator for each electron tube is required, only one vertical sweep generator for all the electron tubes is required. Equipment is thus economically employed.

According to another novel feature of the invention, the above described switching arrangement is employed to prevent the presentation of a letter in the scan sector of the indicator near the vertex of the sector. This prevents a symbol image from interfering with the range indication of an aircraft near touch down.

Among the several objects of this invention are:

In controlling from the ground the landing of approaching aircraft, to provide a means and a method to show, on an indicator, a symbol that identifies the channel in which each plane is being tracked, the symbol being adjacent to and moving in synchronism with the indication of each respective plane;

To show, in connection with any symbol, a warning if a dangerous situation exists with reference to a plane designated by that symbol;

To provide a method and means for maintaining the size of the symbol substantially uniform in its movement on an indicator having an exponential scale.

Referring now to the drawings.

While this invention is particularly applicable to systems for automatic ground controlled approach, its usefulness is not limited thereto. The block diagrams indicate tracking in six channels but a greater or smaller number of channels may be utilized. Whenever specific values are given, they are employed for example or illustration and not by way of limitation.

Generation of the symbols is effected by the flying spot scan by an electron stream in the manner well known in television. The sensitive surface at which the energy of the electrons of the stream is converted has portions of differential energy-transmissive capacity. Thus, between this surface and the source of the electron stream, a mask or stencil may be provided which will prevent the electrons reaching the sensitive surface except over an area having the configuration of the desired symbol and therefore as the stream scans over the surface, conversion of the electron energy takes place at such parts of the scan as to generate video signals of the symbol.

Figure 1:
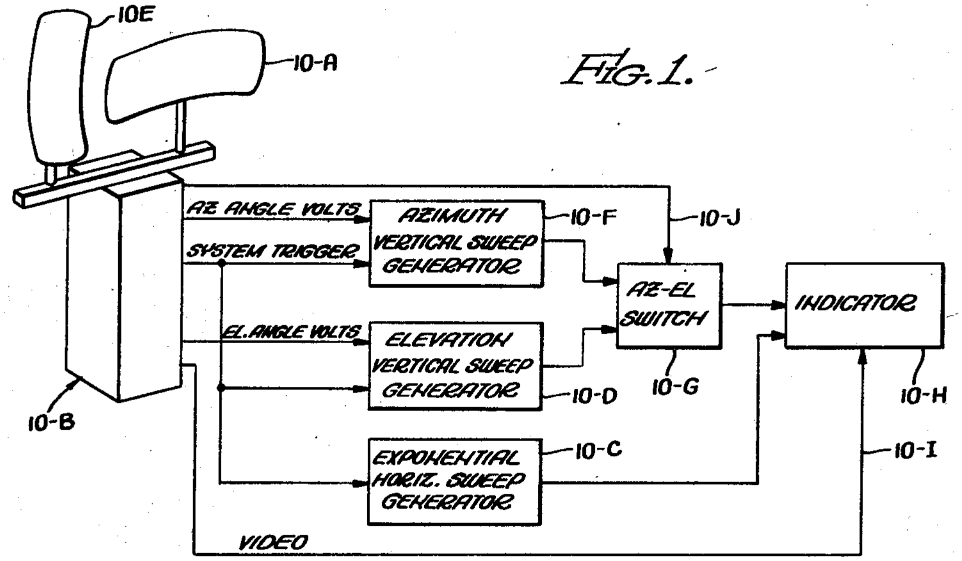
Fig. 1 is an isometric and partial block diagram of a conventional az-el indicator system.

A conventional indicator system is shown in Fig. 1 comprising radar gear 10–B including an elevation antenna 10–E and an azimuth antenna 10–A. The indicator system employed with the radar gear 10–B includes an exponential horizontal sweep generator 10–C, an elevation vertical sweep generator 10–D, an azimuth vertical sweep generator 10–F, an az-el switch 10–G, and an indicator 10–H. Range pulses are applied to the indicator 10–H on a video lead 10–I. The exponential horizontal sweep generator 10–C is employed to produce an exponential horizontal sweep to widen the indicator display at reduced ranges. This permits closer inspection of planes approaching touch down. The elevation vertical sweep generator 10–D is driven by the system trigger and produces a vertical sawtooth sweep voltage when the elevation antenna 10–E is operated.

In the system of Fig. 1, it is intended that a time sharing basis be made for displaying the range of an aircraft both as a function of azimuth and elevation on the same indicator. After the elevation antenna 10–E scans upwardly, the azimuth antenna 10–A may scan to the left; the elevation antenna 10–E may then scan downwardly and the azimuth antenna 10–A may scan to the right. The elevation vertical sweep generator 10–D, when operated by the system trigger, produces a vertical sweep voltage having a slope proportional to the elevation angle voltage which is representative of the angular position of the elevation antenna 10–E. Similarly the azimuth vertical sweep generator 10–F, when operated by the system trigger, produces a sawtooth voltage having a slope proportional to the azimuth angle voltage which is representative of the angular position of the azimuth antenna 10–A.

The az-el switch 10–G is provided with an az-el gate over lead 10–J from the radar gear 10–B. The az-el gate appearing on the lead 10–J thus causes only the output signal of the elevation vertical sweep generator 10–D to be passed by the az-el switch 10–G to the indicator 10–H when the elevation antenna 10–E scans and causes only the output voltage of the azimuth vertical sweep generator 10–F to be passed by the az-el switch 10–G to the indicator 10–H when the azimuth antenna 10–A scans.

Figure 2:
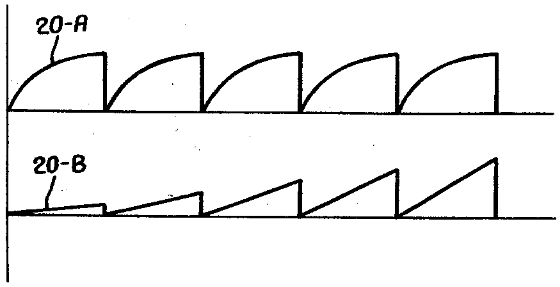
Fig. 2 is a graph of two waveforms characteristic of the operation of several components of the system shown in Fig. 1.

A brief description of the az-el indicator system is deemed necessary in order to better explain the utility of the present invention which is used in cooperation with the indicator 10–H. Integration of the present invention may also be better understood by reference to the sweep voltages shown in Fig. 2 where the waveform 20–A represents the output of the exponential horizontal sweep generator 10–C and the waveform 20–B is representative of the output of either the elevation vertical sweep generator 10–D or the azimuth vertical sweep generator 10–F. For example, as the elevation antenna 10–E increases the slope of the sawtooth wavefrom 20–B increases proportionally.

Figure 3:
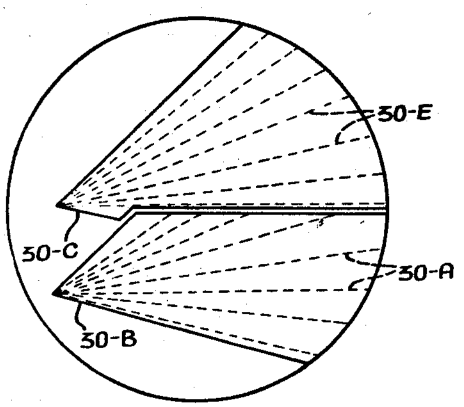
Fig. 3 is a schematic view of the face of an indicator shown in block form in Fig. 1.

Due to the fact that both the waveforms 20–A and 20–B are initiated by the system trigger, the beam of the indicator 10–H, which may be a cathode-ray type tube, is swept at an angle as indicated by the dashed lines 30–A and 30–E in Fig. 3 where the face of the indicator is shown. In the system shown in Fig. 1 the beam of the indicator is swept across two sectors 30–B and 30–C corresponding to azimuth and elevation pictures, respectively. Range is the abscissa of both the sectors shown in Fig. 3. Video is appropriately blanked to provide the peculiarly shaped sectors 30–B and 30–C. According to the time sharing feature of the system shown in Fig. 1, the succeeding lines 30–A may be generated one above a preceding one, and then lines 30–E may be generated one above a preceding one. As the elevation antenna 10–E scans downwardly the lines 30–E are traced from the vertex of sector 30–C in a downward direction. As the azimuth antenna 10–A scans to the right, the lines 30–A may also be traced across and in a downward direction.

Figure 4:
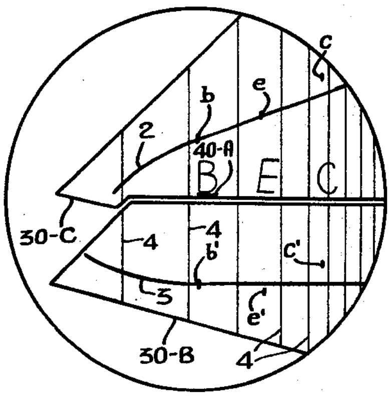
Fig. 4 is a more detailed and enlarged view of the face of the indicator shown in Fig. 1.

Fig. 4 depicts the appearance of the face of the az-el indicator 10–H functioning according to the present invention. Lines 2 and 3 are cursor lines in elevation and in azimuth respectively. These are electronically produced intensity lines representing the idealized glide path and the idealized course in azimuth for aircraft landing under control of the installation.

The spots *b*, *e* and *c* show in the elevation picture the positions of three aircraft with respect to the glide path defined by cursor line 2 and the letters B, E and C under the spots identify the tracking channel assigned to each respective craft. Spots *b'*, *e'* and *c'* show the positions of the same craft with respect to the landing course represented by azimuth cursor line 3. Vertical lines 4, 4, etc., mark distance from the touch down point, becoming closer together as distance from that point increases due to the logarithmic scale used in the indicator.

A bar 40–A below the letter B in Fig. 4 is employed to warn that the aircraft at *b* is in jeopardy or is causing a hazard to other aircraft.

Figure 5:
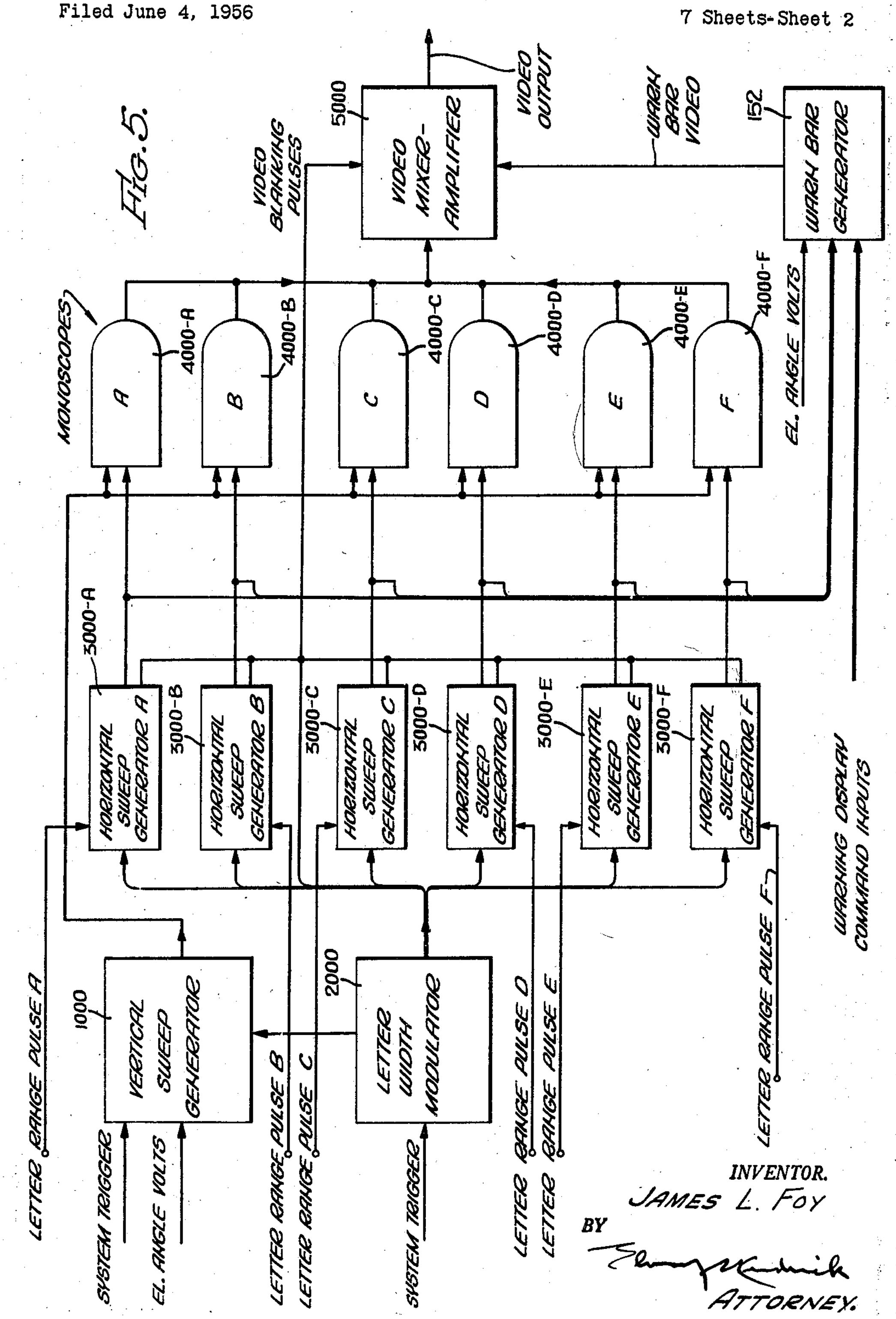
Fig. 5 is a block diagram of one form of symbol or letter generator of the invention.

The embodiment of the invention shown in Fig. 5 includes a vertical sweep generator 1000, a letter width modulator 2000, a plurality of horizontal sweep generators 3000, a plurality of monoscopes 4000 corresponding respectively to the horizontal sweep generators 3000, and a video mixer-amplifier 5000. The monoscopes 4000 are conventional and may be of the type known as Dumont K1043. The video mixer-amplifier 5000 is provided with video pulses from the monoscopes 4000 and video blanking pulses from both the letter width modulator 2000 and the horizontal sweep generators 3000.

Warning bar video is supplied to the video mixer-amplifier 5000 by means of a warn bar generator 152 having inputs from both the horizontal sweep generators 3000 and warning display command inputs indicating that a hazard exists with respect to a particular one of the airplanes being guided by the associated GCA system. The warn bar generator 152 is employed to produce video pulses to generate a bar, for example, such as the bar 40–A shown in Fig. 4. A number of warning display command inputs are provided equal to the number of horizontal sweep generators 3000. Thus, when a warning command is supplied at any one of the several inputs, a bar such as the bar 40–A is produced on the indicator 10–H corresponding to an aircraft which is in jeopardy or which is a hazard to other aircraft in the system.

Figures 6, 8:
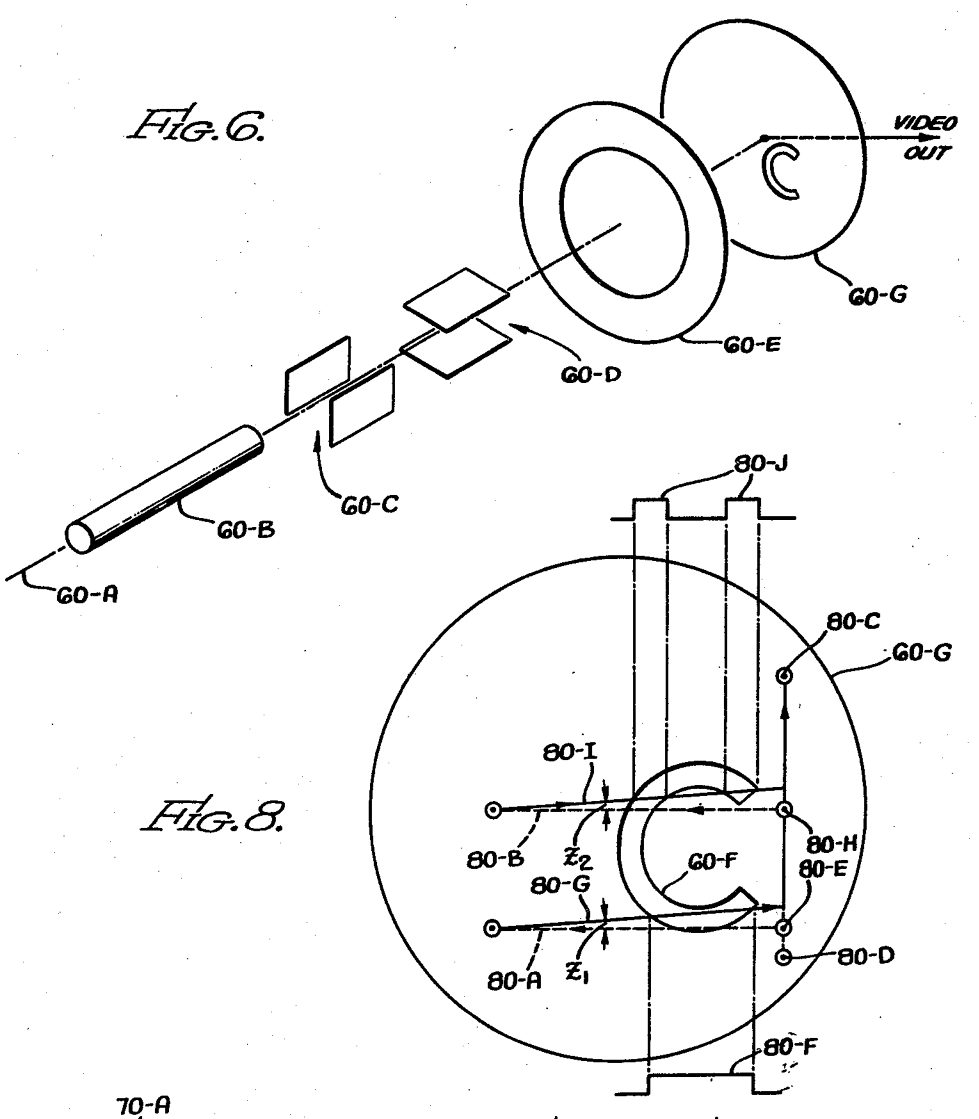
Fig. 6 is an isometric view of a monoscope tube employed in the embodiment of the invention shown in Fig. 5.
Fig. 8 is an enlarged plan view of one of the electrodes employed in the monoscopes shown in Fig. 5.

The operation of the system shown in Fig. 5 may be better understood with reference to Fig. 6 which is an isometric view of the internal arrangement of the monoscopes 4000. A tube axis is indicated at 60–A. On the tube axis 60–A are positioned an electron gun 60–B, a pair of horizontal deflection plates 60–C, a pair of vertical deflection plates 60–D, a collector disc shaped target electrode 60–E delineating a clearance hole, and a disc 60–G delineating a symbol, for example, such as the symbol 60–F in the form of the letter C which may be a dielectric coating or other material having secondary emission characteristics. A target electrode 60–G is then positioned behind collector 60–E. A video output is taken from a lead 60–H connected to the anode or target electrode 60–G. Electrons from the gun pass through the hole in collector 60–E. When scansion causes them to strike the symbol portion 60–G, secondary electrons are emitted to 60–E. These secondary electrons are more numerous than the gun electrons and hence the arrangement gives electron multiplier action.

As the cathode-ray of the monoscope is swept over the symbol 60–F and the beam is directed through the aperture in collector 60–E, secondary emission provides video output pulses which are impressed upon the video mixer-amplifier 5000 shown in Fig. 5.

The operation of the vertical sweep generator 1000 shown in Fig. 5 is similar to the vertical sweep generators 10–G and 10–F shown in Fig. 1. The vertical sweep generator 1000 produces preferably a sawtooth voltage having a slope proportional to elevation angle voltage. This voltage is indicated as an input to the vertical sweep generator 1000, the only other input being indicated as the system trigger. The single output of the vertical sweep generator 1000 is impressed upon all the monoscopes 4000.

The letter width modulator 2000 is operated by the system trigger to produce three outputs which are impressed upon all the horizontal sweep generators 3000. The first output is an exponentially decaying voltage that causes the sawtooth outputs to be produced by the horizontal sweep generators 3000 having slopes decreasing with time in the same fashion that the amplitude of the waveform 20–A in Fig. 2 increases exponentially with time. This permits the production of the symbols B, E and C shown in Fig. 4 on the indicator 10–H of the substantially constant width in spite of the fact that the exponential horizontal sweep generator 10–C produces an exponentially increasing voltage as indicated by the waveform 20–A shown in Fig. 2. The height of the letters B, E and C are also substantially the same because of the particular sweep arrangement provided for the monoscopes 4000 by the vertical sweep generator 1000, the letter width modulator 2000, and the horizontal sweep generators 3000.

The letter width modulator 2000 secondly produces a minimum range gate having a width to prevent the production of a letter, for example, such as the letter "B" in a position too close to the vertex of the elevation sector 30–C. This is deemed necessary since production of a symbol too close to the vertex of the sector 30–C might not only distort the letter, but also might interfere with the display of the range versus elevation picture of an aircraft closest to touch down, i.e. aircraft having the smallest range.

A fixed range pulse is also produced by the letter width modulator 2000 at the end of the minimum range gate. The horizontal sweep generators 3000 are provided with means to initiate a sawtooth voltage in response to the fixed range pulse or a letter range pulse corresponding to a particular aircraft. Each horizontal sweep generator 3000, however, is also provided with a switching arrangement to prevent the generation of a sawtooth voltage in response to a letter range pulse when the letter range pulse occurs within the period of the minimum range gate. When the letter range pulse occurs after the fixed range pulse, the corresponding horizontal sweep generator 3000 is operated only by the letter range pulse and not by the fixed range pulse.

The outputs of the horizontal sweep generators 3000 are impressed upon corresponding monoscopes 4000. The monoscopes 4000 are swept in a manner such that video may be generated in the retrace of the monoscopes. For this reason blanking pulses are provided including the fixed range pulses produced by the letter width modulator 2000 and the input letter range pulses. These video blanking pulses are then applied to video mixer-amplifier 5000 to blank the video output of that amplifier during any of the aforementioned retrace periods.

The sawtooth output voltages of the horizontal sweep generators 3000 are combined with a plurality of warning display command inputs in the warn bar generator 152 which has an additional input of elevation angle voltage to provide a video output which is mixed with the video outputs of the monoscopes 4000 in the video mixer-amplifier 5000.

Figure 7:
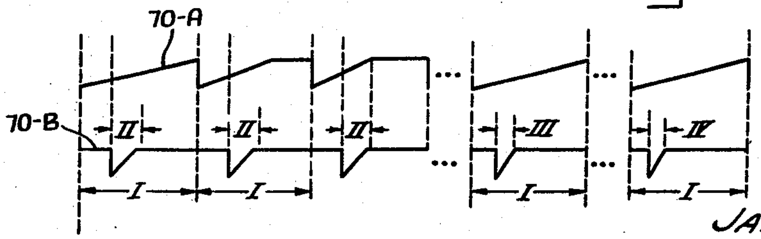
Fig. 7 is a graph of a group of waveforms characteristic of the operation of the invention as shown in Fig. 5.

Waveforms 70–A and 70–B shown in Fig. 7 illustrate representative examples of the outputs of vertical sweep generator 1000 and one of the horizontal sweep generators 3000, respectively. The slope of the sawtooth 70–A generated by the vertical sweep generator 1000 is increased in proportion to the amplitude of the elevation angle voltage. The slope of the sawtooth 70–B is increased as the range of a corresponding aircraft is decreased. It is to be noted that the rate of change of the slope of the waveform 70–A is normally substantially greater than that of the waveform 70–B since the waveform 70–A is increased according to the position of the elevation antenna 10–E and the slope of the waveform 70–B is increased as the range of an aircraft decreases. The frequencies of both the waveforms 70–A and 70–B are equal since both are originally synchronized by the system trigger. Waveform 70–A is actually initiated by this trigger and waveform 70–B is initiated by letter range pulses which are of the same frequency as the system trigger. Application of the above-described sweep voltages to the monoscopes 4000 causes, for example, the symbol 60–F on the disc 60–E, shown in both Figs. 6 and 8, to be swept with the cathode ray of a tube in the same manner that the indicator 10–H is swept as indicated in Fig. 3. However, it is to be noted that the vertex of the sweep sector, for example, such as the sector 30–C need not be identical to the sweep sector on the disc 60–E of the monoscopes 4000. The vertex may be positioned such as, for example, the position 80–A as shown in Fig. 8.

The manner in which a monoscope beam is swept across the target 60–G is shown in Fig. 8. It is to be recognized that the vertical retrace is always initiated during the system trigger and that horizontal retrace is initiated some time thereafter proportional to the range of an aircraft corresponding to the particular monoscope, e.g. the monoscope 4000–C. As stated previously, the rate of change of slope of the vertical sawtooth is substantially greater than that of the horizontal sawtooth. Hence, as the elevation antenna 10–E rises, the symbol 60–F will be swept across at higher and higher levels, e.g. from the level 80–A eventually to the level 80–B. The symbol 60–F is then swept across at lower and lower levels as the elevation antenna 10–E is lowered.

It is to be noted that retrace occurs at a time just preceding a trace period for both the horizontal and vertical sweeps. For this reason, the beam of the monoscope 4000–C will normally rest at a point 80–C. Vertical retrace causes the tube beam to move to the point 80–D. As vertical trace occurs the beam is directed along a vertical line to the point 80–C again. Depending upon the rate of the vertical sweep and the range of aircraft "C" or the fixed range pulse, a horizontal retrace will occur, e.g. at 80–E. Video will be blanked during retrace by both the letter and fixed range pulses. During the trace period, letter video 80–F will be generated when the monoscope beam is swept along the line 80–G. Similarly, at a later time after the elevation antenna 10–E is raised to a higher elevation, horizontal retrace will occur at point 80–H and a trace will be made along a line 80–I to produce letter video 80–J. Eventually, the tube beam winds up at point 80–C regardless of the position of its trace line.

It is advantageous that the horizontal trace period is substantially shorter than the vertical trace period in that angles $Z_1$ and $Z_2$ between 80–A, 80–G and 80–H, 80–I, respectively, are relatively small and no substantial distortion will be produced on the az-el indicator. For example, in Fig. 4 the letters in the sector 30–C will subtend an angle of little more than four or five degrees. Compensation is also made in another way, viz. the angles Z automatically increase with the elevation of antenna 10–E. That is, $Z_2$ is larger than $Z_1$ because the vertical sweep rate is increased with the elevation angle voltage and the vertical position of the retrace point, e.g. the point 80–E or the point 80–H, is increased in the same proportion.

In addition compensation is automatically made for equal letter heights on the az-el indicator because for the system trigger pulse initiating the retrace at point 80–E, the points corresponding to the point 80–E, e.g. on monoscopes of aircraft having greater ranges, will appear at a corresponding higher position on the monoscope target electrodes. This is true because the monoscope horizontal sweeps of symbols for aircraft at greater ranges will be initiated later in time. Hence, the symbols for aircraft at the greater ranges are swept entirely before those at the smaller ranges and letter heights appear identical on the az-el indicator.

Figures 9, 11:
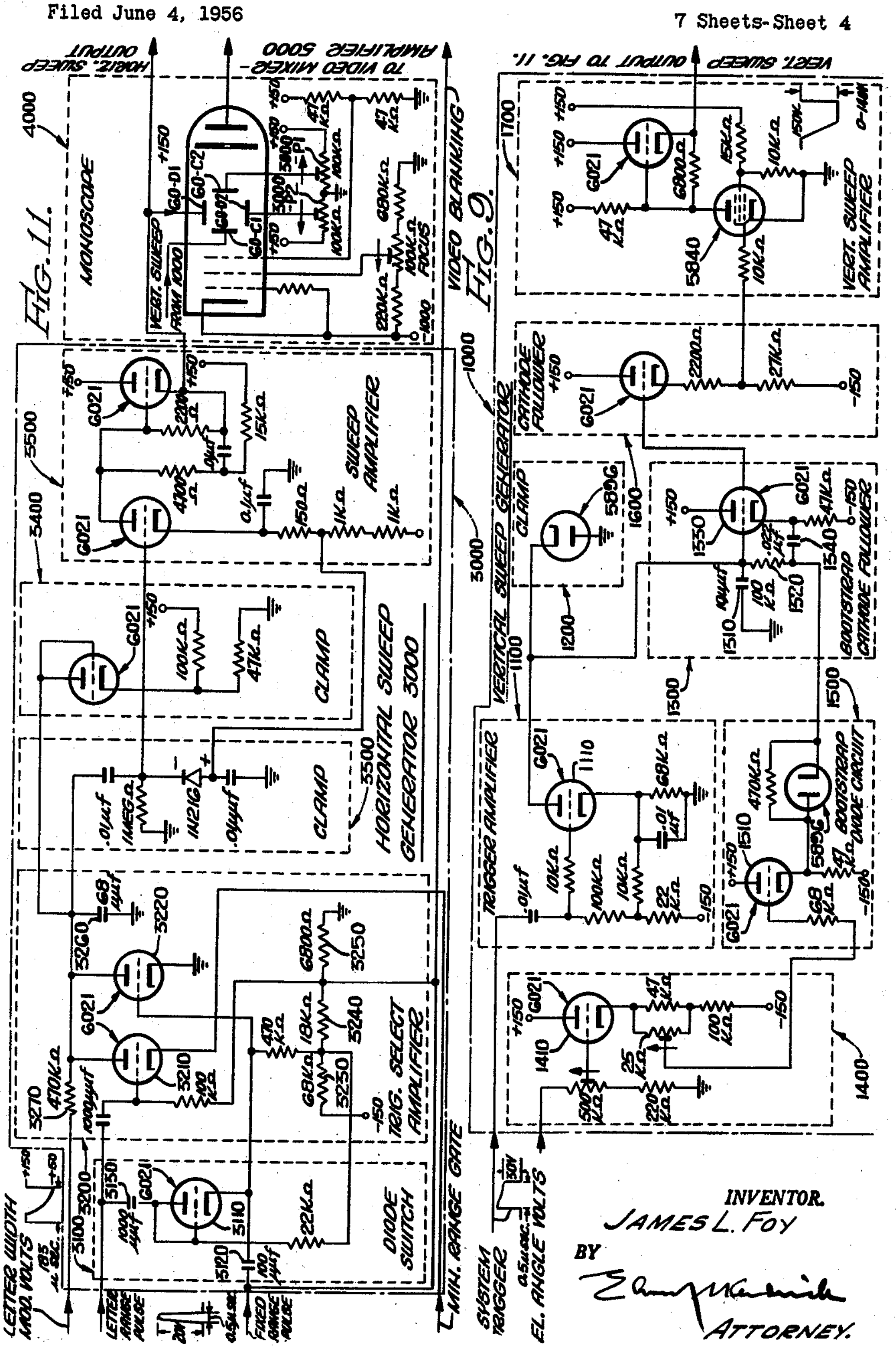
Fig. 9 is a schematic diagram of a vertical sweep generator shown in Fig. 5.
Fig. 11 is a schematic diagram of a horizontal sawtooth sweep generator shown in Fig. 5.

The vertical sweep generator 1000 is shown in detail in Fig. 9 comprising trigger amplifier 1100, a clamp 1200, a bootstrap cathode follower 1300, a cathode follower 1400, a bootstrap diode circuit 1500, a cathode follower 1600 and a vertical sweep amplifier 1700. The trigger amplifier 1100 is provided with a tube 1110 which has a grid input from the system trigger. The tube 1110 is employed to discharge a capacitor 1310 in the bootstrap cathode follower 1300 to zero volts during the interval of the system trigger. A resistor 1320 connected from the bootstrap diode circuit 1500 to the grid of the tube 1330 is, in combination with the capacitor 1310, employed to produce a sawtooth voltage the slope of which is proportional to a shifted elevation angle voltage input. This input is provided from the cathode follower 1400 incorporating a triode 1410 and through a triode 1510 and a bootstrap diode circuit 1500. Bootstrap cathode follower 1300 assures a linear sweep over the entire vertical sweep period. The output cathode follower 1600 and the vertical sweep amplifier 1700 are conventional.

Figure 10:
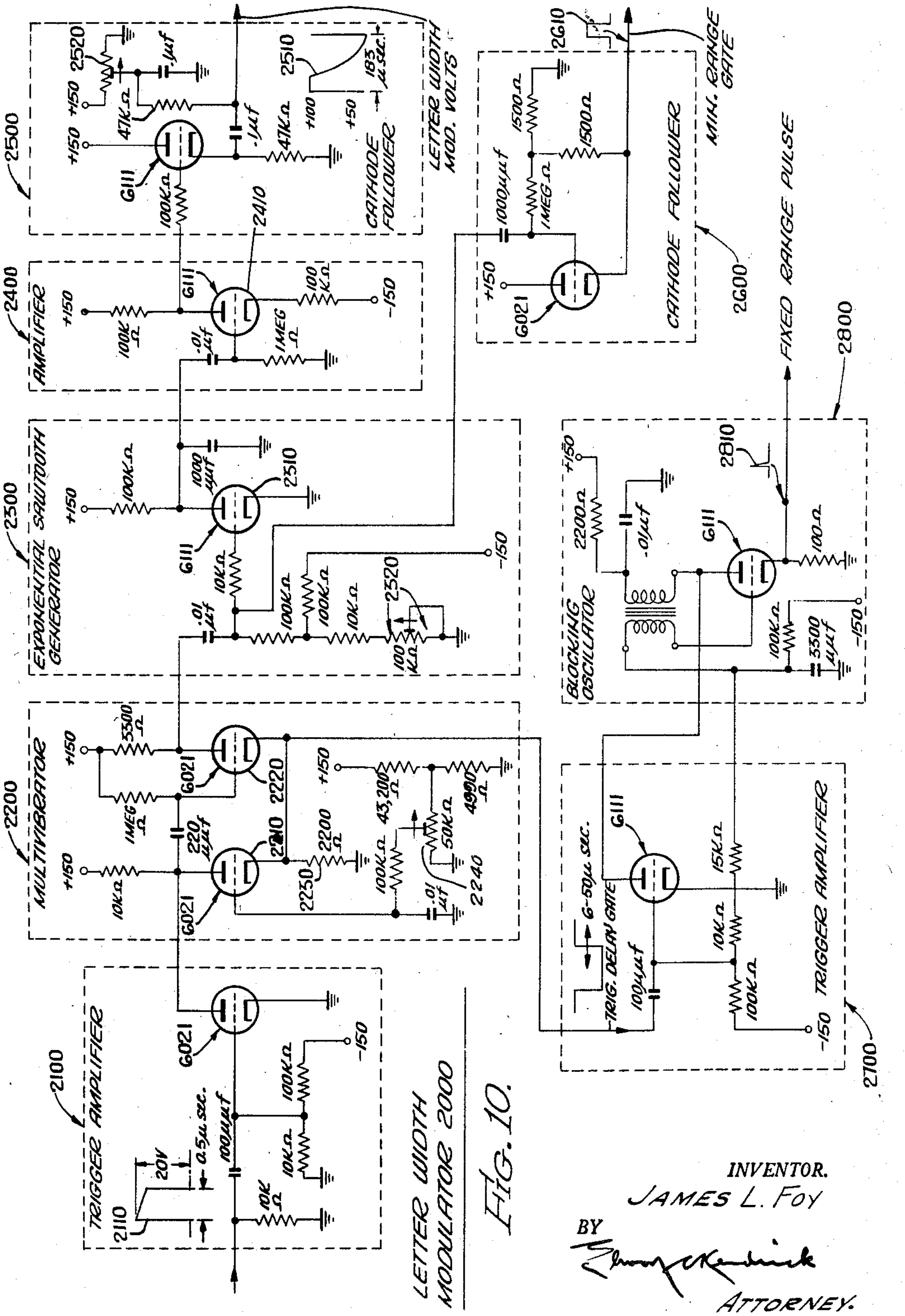
Fig. 10 is a schematic diagram of a letter width modulator shown in Fig. 5.

The letter width modulator 2000 is shown in the schematic diagram of Fig. 10 comprising a trigger amplifier 2100 providing an input to a multivibrator 2200 which is in turn connected to a cathode follower 2500 through an exponential sawtooth generator 2300 and an amplifier 2400. The output of the cathode follower 2500 is the letter width modulating voltage which has a waveform as indicated by 2510. This output voltage is employed to modulate the slopes of the sawtooth voltage outputs of the horizontal sweep generators 3000.

A minimum range gate is provided by the letter width modulator 2000 from a cathode follower 2600 which is connected from the output of the multivibrator 2200. The fixed range pulse is generated by a blocking oscillator 2800 which is operated by the multivibrator 2200 through a trigger amplifier 2700. The waveform of the minimum range gate is indicated at 2610 and the waveform of the fixed range pulse is indicated at 2810. The trigger amplifier 2100 amplifies the system trigger input provided therefor and indicated at the waveform 2110.

The multivibrator 2200 is conventional and includes a pair of triodes 2210 and 2220 which are provided with a common cathode resistor 2230. The exponential sawtooth generator 2300 is provided with a triode 2310 which is employed to generate a positive going exponential waveform at its plate. The exponential waveform is A.C. coupled to an inverter amplifier tube 2410 in the amplifier 2400. The amplifier 2400 then drives the conventional cathode follower 2500. The output of cathode follower 2500 is A.C. coupled whereby any D.C. level may be added to the negative going exponential waveform. Such an adjustment is provided by a potentiometer 2520. The particular adjustment of a potentiometer 2320 in the grid circuit of the tube 2310 in the exponential sawtooth generator 2300 determines the amplitude of the exponential waveform 2510. The cathode follower 2600 is employed to produce a minimum range gate depending upon the time constant of the multivibrator 2200, the cathode follower 2600 being coupled from the output of the multivibrator 2200. A potentiometer 2240 in the multivibrator 2200 determines this time constant.

The multivibrator 2200 also drives the trigger amplifier 2700. The blocking oscillator 2800 then produces a fixed range pulse at the end of the delay gate produced by the multivibrator 2200 to initiate the generation of horizontal sawtooth voltages by the horizontal sweep generators 3000 at the end of a minimum range delay. The fixed range pulse however will not enable the horizontal sweep generators 3000 unless a letter range pulse is received before the fixed range pulse. This will be explained in greater detail in connection with the operation of the sweep generators 3000.

A horizontal sweep generator 2000 is shown in Fig. 11 comprising a diode switch 3100, a trigger select amplifier 3200, a pair of clamps 3300 and 3400, and a sweep amplifier 3500. The diode switch 3100 includes a tube 3110 and a 100 micromicrofarad capacitor 3120. The trigger select amplifier is provided with a biasing circuit including three resistors 3230, 3240 and 3250 to provide bias for all tubes 3110, 3210 and 3220. Two inputs are provided to the tube 3210, viz. a letter range pulse input and a minimum range gate input, the letter range pulse input being impressed upon the grid of the tube 3210 and the minimum range gate input being impressed upon the cathode of the tube 3210. The minimum range gate prevents the tube 3210 from conducting and discharging capacitor 3260 to initiate the generation of the horizontal sweep voltage when the letter range pulse and the minimum range gate are coincident. This means that a letter range pulse which occurs after the system trigger, and at a time thereafter proportional to the range of an aircraft corresponding to the particular horizontal sweep generator 3000, will initiate the generation of the saw-tooth sweep voltage, but will not if the letter range pulse occurs within the minimum range gate.

The capacitor 3260 is alternatively discharged through the tube 3220 by the application of a fixed range pulse to the grid thereof. However, it is to be noted that the fixed range pulse will not cause the capacitor 3260 to discharge through tube 3220 unless the letter range pulse is received during the period of the minimum range gate. This is the function of the diode switch 3100, i.e., to increase the grid potential of the tube 3220 through the charging of the capacitor 3120 through the diode 3110 upon the reception of a letter range pulse. In this case the fixed range pulse applied to the capacitor 3120 will cause the tube 3220 to discharge the capacitor 3260, the capacitor 3120 acting as a storage device. The diode switch 3100 and the trigger select amplifier 3200 thus form logical "or" and "not" gates. That is, either the letter range pulse "or" the fixed range pulse willl be permitted to discharge the capacitor 3260 but "not" both during one system trigger period. The letter range pulse is permitted to discharge the capacitor 3260 when it is impressed upon the tube 3210 after the minimum range gate. The letter range pulse will not be permitted to discharge the capacitor 3260 when applied to the tube 3210 during the minimum range gate. However, the letter range pulse will enable the fixed range pulse when applied to the tube 3220 to cause the capacitor 3260 to be discharged. When the letter range pulse occurs after the minimum range gate the grid of the tube 3220 will not be raised by the charging of the capacitor 3120 and hence the fixed range pulse will have no effect upon the discharge of the capacitor 3260.

The RC combination of a resistor 3270 and the capacitor 3260 in the trigger select amplifier 3200 produces a sawtooth horizontal sweep voltage, the slope of which is determined by the letter width modulating voltage which is impressed upon the trigger select amplifier 3200 through the resistor 3270 by the letter width modulator 2000. The sawtooth voltage produced by the RC combination of the resistor 3270 and the capacitor 3260 is amplified by the sweep amplifier 3500 which is conventional. The video blanking signal is taken from the negative side of the resistor 3250 in the trigger select amplifier 3200 to blank the video mixer amplifier 5000 when letter range pulses are received. This is combined with the fixed range pulses from the letter width modulator 2000 to blank the video mixer amplifier 5000 all times when the fixed range pulse is generated. This prevents "retrace" video from being passed by the video mixer amplifier 5000 when the letter range pulse occurs at a time either before or after the minimum range gate or when the fixed range pulse is generated.

The sawtooth voltage output of the horizontal sweep generator 3000 is impressed directly upon a horizontal plate 60–C1 of a monoscope 4000, the other horizontal plate 60–C2 being connected to a potentiometer 3000–P having one end grounded and the other end connected to a positive 150 volt power supply. The output of all the horizontal sweep generators 3000 are also impressed upon the warn bar generator 152 and there combined with respective warning display command inputs as will be explained subsequently.

Figure 12:
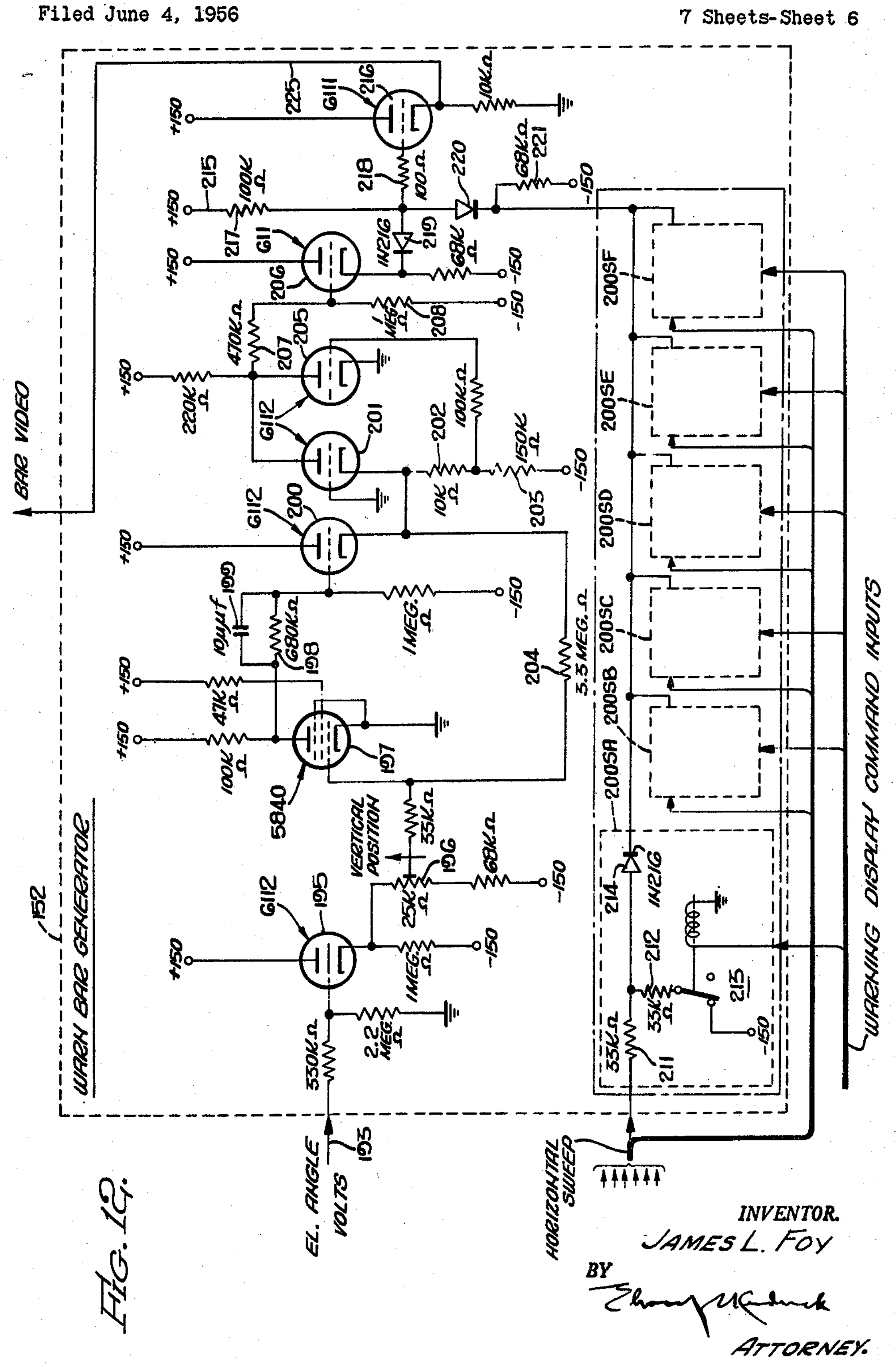
Fig. 12 is a schematic view of a warn bar generator shown in block form in Fig. 5.

The circuitry for giving warning signals is shown in Fig. 12, whereby is generated a bar under the symbol on the az-el indicator defining the channel concerning which a warning is given. The elevation angle voltage, which varies from 2 volts to 52 volts, is transmitted over conductor 193 to the grid of tube 195 which has a shunt cathode resistor 196 from which a cathode follower connection to the grid of tube 197 is taken whereof the plate is tied by parallel connected resistor 198 and capacitor 199 to the grid of tube 200. Tubes 195, 197 and 200 amplify the signal and fix the D.C. level thereof and the signal is inverted at the plate of tube 197. The indicated variable connection to resistor 196 is to adjust the vertical position of the warning bar on the indicator. Tube 201 has resistors 202 and 203 in series with its cathode to negative 150 volts and its grid is grounded. The control grid of pentode 197 is connected through 3.3 megohm resistor 204 to the high end of resistor 202 and the cathode of tube 200 is directly connected to the same point. Tube 205 has its plate tied to the plate of tube 201, its cathode grounded and its grid connected to a point between resistors 202 and 203. The plates of tubes 201 and 205 are connected to the grid of tube 206 through resistor 207 and thence to negative 150 volts through one megohm resistor 208.

When the elevation angle voltage is two volts tube 200 is conducting and the current from its cathode through resistor 202 holds the cathode of tube 201 sufficiently positive that tube 201 does not pass current but the voltage at the high end of resistor 203 on the grid of tube 205 makes the last-named tube conduct. However, as the elevation angle voltage increases the voltage drop at the plate of tube 197 cuts down the conductivity of tube 200 until the point is reached that the grid of tube 205 becomes so negative that the tube is cut off. Ten milliseconds later the cathode of tube 201 becomes sufficiently negative that this tube begins to conduct, but in the interval a positive going pulse has been generated at the plate of tube 205 that makes tube 206 conduct during that interval. On the downward sweep of the elevation angle voltage conduction is thrown from tube 201 back to tube 205 with the generation of another ten milliseconds pulse.

A portion of the energy of the horizontal sweep pulse, which goes from negative 50 volts to plus 150 volts, is taken off through conductor 210 and series resistors 211 and 212. The junction of these two resistors is connected to negative 150 volts through a relay 213 that is opened when a warning signal is present. It is to be understood that there is a conductor such as 210 and a coacting relay 213 for each tracking channel in combining circuits 200–SA, 200–SB, etc. Normally the negative 150 volts applied through relay 213 holds the anode of crystal 214 negative so there is no conduction through the crystal. Conductor 215, which is connected to positive 150 volts, is connected to the grid of tube 216 through 100,000 ohm resistor 217 and 100 ohm resistor 218 and to the high end of the cathode load of tube 206 by resistor 217 and crystal 219. When tube 206 is off, the drop through resistor 217 due to current through crystal 219 holds the grid of tube 216 negative and keeps that tube cut off. Conductor 215 is also connected to the anode of crystal 220 whereof the cathode is connected to the high end of resistor 221, where the cathode of crystal 214 is also connected. The low end of resistor 221 is connected to negative 150 volts but when curent is flowing through crystal 220 the high end of resistor 221 is at negative 20 volts.

When elevation angle voltage causes tube 206 to conduct the cathode of crystal 219 is thrown positive and no current from conductor 215 passes through this crystal, but so long as relay 213 remains closed the current drawn through crystal 220 keeps tube 216 cut off. However, when relay 213 is opened by a warning signal the next horizontal sweep pulse will pass through crystal 214 and raise the high end of resistor 221 above zero, thus cutting off conduction through crystal 220. When such cutting off of conduction through crystal 220 coincides with the conductive state of tube 206 there is no flow of current through resistor 217, tube 216 is fired, and a bar video signal is sent out through conductor 225 to produce a bar under the symbol pertaining to the channel from which the horizontal sweep pulse came when tube 216 was ignited.

Figure 13:
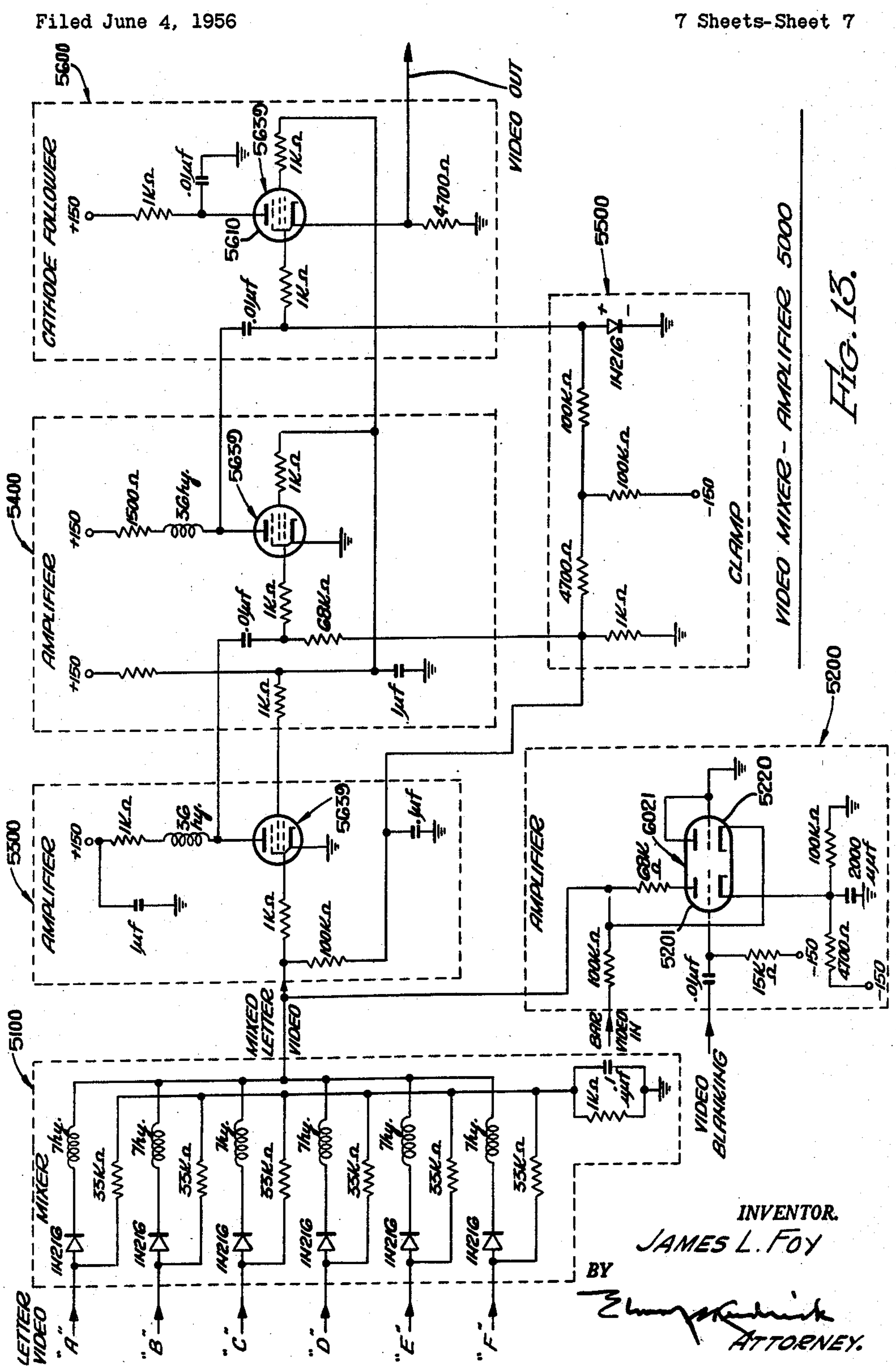
Fig. 13 is a schematic diagram of a video mixer amplifier shown in block form in Fig. 5.

The video mixer-amplifier 5000 is shown in Fig. 13. The mixer-amplifier 5000 comprises a mixer 5100, which is of the conventional type, a bar video input amplifier 5200, a letter video input amplifier 5300, a combined output amplifier 5400, a clamp 5500 and an output cathode follower 5600. Video blanking for both the bar and letter video is applied to a tube 5210 of the bar video input amplifier 5200. Letter video and bar video are combined in the letter video input amplifier 5300 and both letter and bar videos are amplified by the output amplifier 5400 which is conventional. A tube 5220 in the bar video input amplifier 5200 clamps the input of the amplifier in a manner such that negative going noise generated in the monoscopes 3000 will not be amplified, i.e. all negative going input signals are clamped to zero by the clamp 5220. The clamp 5500 is employed to limit the output of a pentode 5610 in cathode follower 5600 to plus 2 volts. The representative pulse response for positive going pulses is a minimum of 5 megacycles.

What is claimed is:

1. In a ground controlled approach system that has a track-while-scan assembly and includes devices to generate cyclically a discrete range pulse unique to a respective aircraft in each of a plurality of tracking channels, an elevation angle signal, an error warning signal when an aircraft in any channel gets into a dangerous situation, and a system trigger pulse at the beginning of each cycle of range pulses, and also includes an indicator responsive to range signals to display a continuous visual indication of the relative position of each craft being tracked: a novel functional supplement including means to generate a stream of electrons, means responsive to the elevation angle signal to generate a vertical sweep voltage, means responsive to a range pulse to generate a horizontal sweep voltage, means to apply the two sweep voltages to sweep the electron stream, means including the target of the mono-electrode type in the path of said electron stream to convert energy derived from the electron stream into fluctuating electric currents that constitute a video signal capable of producing a visual image of the symbol, means including an element that delineates a symbol disposed to limit the effective surface on said target scanned by the electron stream to an area in the form of the symbol, means to mix the video signal with signals from the said assembly to the indicator, and means to apply the mixed signals to the indicator to produce an image of the symbol adjacent to and moving in synchronism with the positional indication of the craft in the tracking channel designated by the symbol.

2. In a ground controlled approach system including a cathode-ray type indicator responsive to symbol range pulses for displaying the range of an aircraft, said system also including means for sweeping the cathode ray of the indicator during a predetermined trace period, the combination comprising: an electron tube including an evacuated envelope, an electron gun at one end of said envelope for producing an electron stream, a target at the opposite end of said envelope, and an apertured electrode adjacent said target electrode delineating a symbol in a plane substantially perpendicular to the axis of said electron tube, said symbol representing the identity of an aircraft in said system; means for sweeping the electron stream of said tube over said apertured electrode during a trace period substantially less than said predetermined trace period; and means for producing video signals proportional to the time that the electron stream passes through the aperture of said apertured electrode and impinges on said target electrode, whereby, upon the application of said video signals to the indicator, an image of said symbol may be produced adjacent to and moving in synchronism with the range indication of a corresponding aircraft to identify said range indication with said corresponding aircraft.

3. In a ground controlled approach system having radar apparatus for periodically scanning a predetermined volume in space to produce symbol range pulses representative of the position of an aircraft, said system including a cathode-ray type indicator responsive to said symbol range pulses for displaying the range of an aircraft as a function of one of its angular coordinates, said system also including means for applying a first horizontal sweep voltage to the indicator, said first horizontal sweep voltage having a predetermined trace period, and means for applying a first vertical sawtooth sweep voltage to the indicator, said first vertical sweep voltage having a slope proportional to the scanning angle of the radar apparatus, the combination comprising: a plurality of electron tubes, each of said tubes including an evacuated envelope, an electron gun at one end of said envelope for producing an electron stream, a target at the opposite end of said envelope, and an apertured electrode adjacent said target electrode delineating a symbol in a plane substantially perpendicular to the axis of said electron tube, each of said symbols representing the identies of aircraft in the system; deflection means for each of said tubes; first means responsive to symbol range pulses corresponding to particular aircraft for applying second horizontal sweep voltages to the deflection means of corresponding tubes at different times corresponding to the times at which said respective symbol range pulses are received, said first means being responsive to a particular symbol range pulse for applying only a particular one of said second horizontal sweep voltages to a particular one of said electron tubes, said second horizontal sweep voltages having trace periods substantially less than said predetermined trace period; second means for applying a second vertical sawtooth sweep voltage to the deflection means of each of said tubes, said second vertical sweep voltage also having a trace period substantially less than that of said first vertical sweep voltage and having a slope proportional to that of said first vertical sweep voltage; third means for producing video signals proportional to the time that electron stream passes through the aperture of said apertured electrode and impinges on said target electrode; and fourth means for applying said video signals to the indicator to produce images of said symbols adjacent to and moving in synchronism with the range indications of corresponding aircraft, said images thereby identifying said range indications with said corresponding aircraft.

4. The invention as defined in claim 3, wherein the slopes of said second horizontal sweep voltages are proportional to the amplitude of said first horizontal sweep voltage.

5. The invention as defined in claim 4, wherein said first horizontal sweep voltage increases exponentially.

6. In a ground controlled approach system having radar apparatus for periodically scanning a predetermined volume in space to produce symbol range pulses representative of the position of an aircraft, said system including a cathode-ray type indicator responsive to said symbol range pulses for displaying the range of an aircraft as a function of one of its angular coordinates, said system also including means for applying a first horizontal sweep voltage to the indicator, said first horizontal sweep voltage having a predetermined trace period, and means for applying a first vertical sawtooth sweep voltage to the indicator, said first vertical sweep voltage having a slope proportional to the scanning angle of the radar apparatus, the combination comprising: a plurality of cathode-ray type electron tubes, an element for each of said tubes delineating an area in the form of a symbol in a plane substantially perpendicular to the axis of each of said tubes, said symbols representing the identities of aircraft in the system; first means responsive to symbol range pulses corresponding to particular aircraft for applying second horizontal sweep voltages to corresponding ones of said tubes at different times corresponding to the times at which said respective symbol range pulses are received, said first means being responsive to a particular symbol range pulse for applying only a particular one of said second horizontal sweep voltages to a particular one of said electron tubes, said second horizontal sweep voltages having trace periods substantially less than said predetermined trace period; second means for applying a second vertical sawtooth sweep voltage to each of said tubes, said second vertical sweep voltage also having a trace period substantially less than that of said first vertical sweep voltage and having a slope proportional to that of said first vertical sweep voltage; third means for producing video signals proportional to the time that the cathode-rays of said tubes are directed toward the areas of said symbols; fourth means for applying said video signals to the indicator to produce images of said symbols adjacent to and moving in synchronism with the range indications of corresponding aircraft, said images thereby identifying said range indications with said corresponding aircraft; the slopes of said second horizontal sweep voltages being proportional to the amplitude of said first horizontal sweep voltage, said first horizontal sweep voltage increasing exponentially; fifth means for producing a fixed range pulse; sixth means for producing a minimum range gate, said first means being normally responsive only to said symbol range pulses; seventh means responsive to said symbol range pulses for making said first means responsive to said fixed range pulse when one of said symbol range pulses occurs during said minimum range gate; and eighth means responsive to said minimum range gate for making said first means non-responsive to one of said symbol range pulses when said one of said symbol range pulses occurs during the period of said minimum range gate.

7. In a ground controlled approach system including a cathode-ray type indicator responsive to symbol range pulses for displaying the range of an aircraft as a function of some other spacial coordinate of the aircraft, a novel switching arrangement for use with a functional supplement to the system, the functional supplement including a cathode-ray type electron tube for use with the indicator to produce an indication of the identity of an aircraft adjacent to and moving in synchronism with the range indication of that particular aircraft on the indicator, said arrangement comprising: first means for producing a fixed range pulse, second means for producing a minimum range gate, a horizontal sweep generator for said cathode-ray type electron tube, said horizontal sweep generator being normally responsive only to said symbol range pulses, third means responsive to said symbol range pulses for making said generator responsive to said fixed range pulses when said symbol range pulses occur during said minimum range gate, and fourth means responsive to said minimum range gate for making said generator non-responsive to said symbol range pulses when said symbol range pulses occur during the period of said minimum range gate.

8. In a ground controlled approach system having radar apparatus for periodically scanning a predetermined volume in space to produce symbol range pulses representative of the position of an aircraft, said system including a cathode-ray type indicator responsive to said symbol range pulses for displaying the range of an aircraft as a function of one of its angular coordinates, said system also including means for applying a first horizontal sweep voltage to the indicator, said first horizontal sweep voltage having a predetermined trace period, and means for applying a first vertical sawtooth sweep voltage to the indicator, said first vertical sweep voltage having a slope proportional to the scanning angle of the radar apparatus, the combination comprising: a plurality of cathode-ray type electron tubes, an element for each of said tubes delineating an area in the form of a symbol in a plane substantially perpendicular to the axis of each of said tubes, said symbols representing the identities of aircraft in the system; first means responsive to symbol range pulses corresponding to particular aircraft for applying second horizontal sweep voltages to corresponding ones of said tubes at different times corresponding to the times at which said respective symbol range pulses are received, said first means being responsive to a particular symbol range pulse for applying only a particular one of said second horizontal sweep voltages to a particular one of said electron tubes, said second horizontal sweep voltages having trace periods substantially less than said predetermined trace period; second means for applying a second vertical sawtooth sweep voltage to each of said tubes, said second vertical sweep voltage also having a trace period substantially less than that of said first vertical sweep voltage and having a slope proportional to that of said first vertical sweep voltage; third means for producing video signals proportional to the time that the cathode-rays of said tubes are directed toward the areas of said symbols; fourth means for applying said video signals to the indicator to produce images of said symbols adjacent to and moving in synchronism with the range indications of corresponding aircraft, said images thereby identifying said range indications with said corresponding aircraft; fifth means for producing a fixed range pulse; sixth means for producing a minimum range gate, said first means being normally responsive only to said symbol range pulses; seventh means responsive to said symbol range pulses for making said first means responsive to said fixed range pulse when one of said symbol range pulses occurs during said minimum range gate; and eighth means responsive to said minimum range gate for making said first means non-responsive to said symbol range pulses when one of said symbol range pulses occurs during the period of said minimum range gate.

9. In a ground controlled approach system having radar apparatus for periodically scanning a predetermined volume in space to produce symbol range pulses representative of the position of an aircraft, said system including a cathode-ray type indicator responsive to said symbol range pulses for displaying the range of an aircraft as a function of one of its angular coordinates, said system also including means for applying a first horizontal sweep voltage to the indicator, said first horizontal sawtooth sweep voltage having an amplitude increasing exponentially, and means for applying a first vertical sawtooth sweep voltage to the indicator, said first vertical sweep voltage having a slope proportional to the scanning angle of the radar apparatus, the combination comprising: a plurality of electron tubes, each of said tubes including an evacuated envelope, an electron gun at one end of said envelope for producing an electron stream, a target at the opposite end of said envelope, and an apertured electrode adjacent said target electrode delineating a symbol in a plane substantially perpendicular to the axis of said electron tube, said symbols representing the identities of aircraft in the system; first means responsive to said symbol range pulses for applying a plurality of second horizontal sweep voltages to each of said tubes at different times corresponding to the times at which said respective symbol range pulses are received, said first means being adapted to apply one of said second horizontal sweep voltages to a corresponding particular one of said electron tubes, said second horizontal sweep voltages having trace periods substantially less than the trace period of said first horizontal sweep voltage; second means for applying a second vertical sawtooth sweep voltage to each of said tubes, said second vertical sweep voltages also having a trace period substantially less than the trace period of said first vertical sweep voltage and having a slope proportional to that of said first vertical sweep voltage; third means for producing video signals proportional to the time electron stream passes through the aperture of said apertured electrode and impinges on said target electrode; fourth means for applying said video signals to the indicator to produce images of said symbols adjacent to and moving in synchronism with the range indications of corresponding aircraft, said images thereby identifying said range indications with said corresponding aircraft; and fifth means for maintaining the slopes of said second horizontal sweep voltages proportional to the amplitude of said first horizontal sweep voltage to minimize the distortion of the images of said symbols on said indicator.

10. In a ground controlled approach system that includes an indicator, means to produce on the indicator positional indications of the range and elevation of an aircraft in the field of the system and means to emit elevation angle signals and range signals: a functional supplement comprising means to generate an electron stream, means responsive to elevation angle and range signals to deflect the electron stream vertically and horizontally, means to derive from the energy of the stream an electric current constituting a video signal capable of producing a visible image of a symbol, means to exhibit the image of the symbol on the indicator adjacent to and moving in synchronism with a positional indication of an aircraft, and means operable in response to a warning signal to generate and display on the indicator another mark in visual correspondence to and moving in synchronism with the symbol pertaining to the channel concerning which the warning signal was given.

11. The invention as defined in claim 10, wherein said means is responsive to an error warning signal to generate and display on the indicator a bar beneath the symbol pertaining to the channel concerning which the error warning signal was given.

References Cited in the file of this patent

UNITED STATES PATENTS

| | | |
|---|---|---|
| 2,438,709 | Labin et al. | Mar. 30, 1948 |
| 2,461,667 | Sunstein | Feb. 15, 1949 |
| 2,741,760 | Franke | Apr. 10, 1956 |

UNITED STATES PATENT OFFICE

CERTIFICATE OF CORRECTION

Patent No. 2,935,744 May 3, 1960

James L. Foy

It is hereby certified that error appears in the printed specification of the above numbered patent requiring correction and that the said Letters Patent should read as corrected below.

Column 3, lines 60 and 61, after "increases" insert a comma; column 9, line 3, after "5000" insert -- at --; line 12, for "3000-P" read -- 3000-P1 --; line 14, for "output" read -- outputs --; same column 9, line 44, after "volts" insert a comma; column 10, line 12, before "the" insert a comma; column 11, line 45, for "identies" read -- identities --; column 14, line 27, after "time" insert -- that said --.

Signed and sealed this 1st day of November 1960.

(SEAL)
Attest:

KARL H. AXLINE
Attesting Officer

ROBERT C. WATSON
Commissioner of Patents